Inventor,
Woodruff T. Sullivan

Attorneys.

July 19, 1949. W. T. SULLIVAN 2,476,780
MACHINE FOR CUTTING DOUBLE PILE FABRICS
Filed Dec. 11, 1947 16 Sheets-Sheet 3
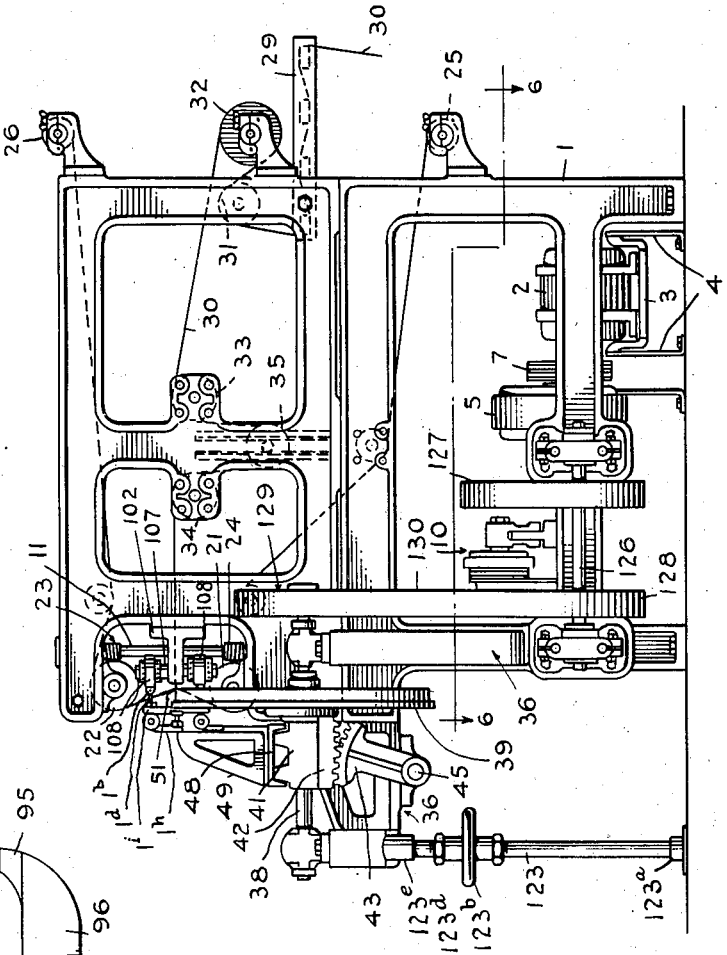
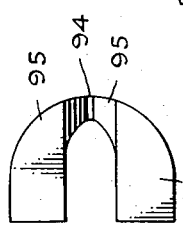
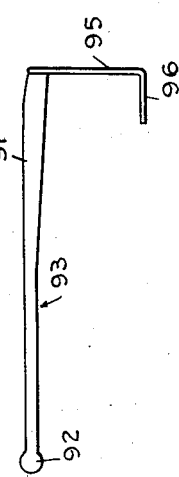
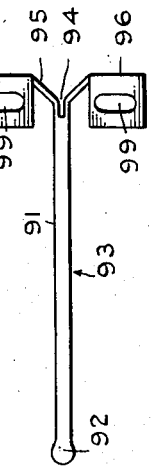
INVENTOR,
WOODRUFF T. SULLIVAN.
By E. E. Vrooman & Co.,
ATTORNEYS.

July 19, 1949. W. T. SULLIVAN 2,476,780
MACHINE FOR CUTTING DOUBLE PILE FABRICS
Filed Dec. 11, 1947 16 Sheets-Sheet 4
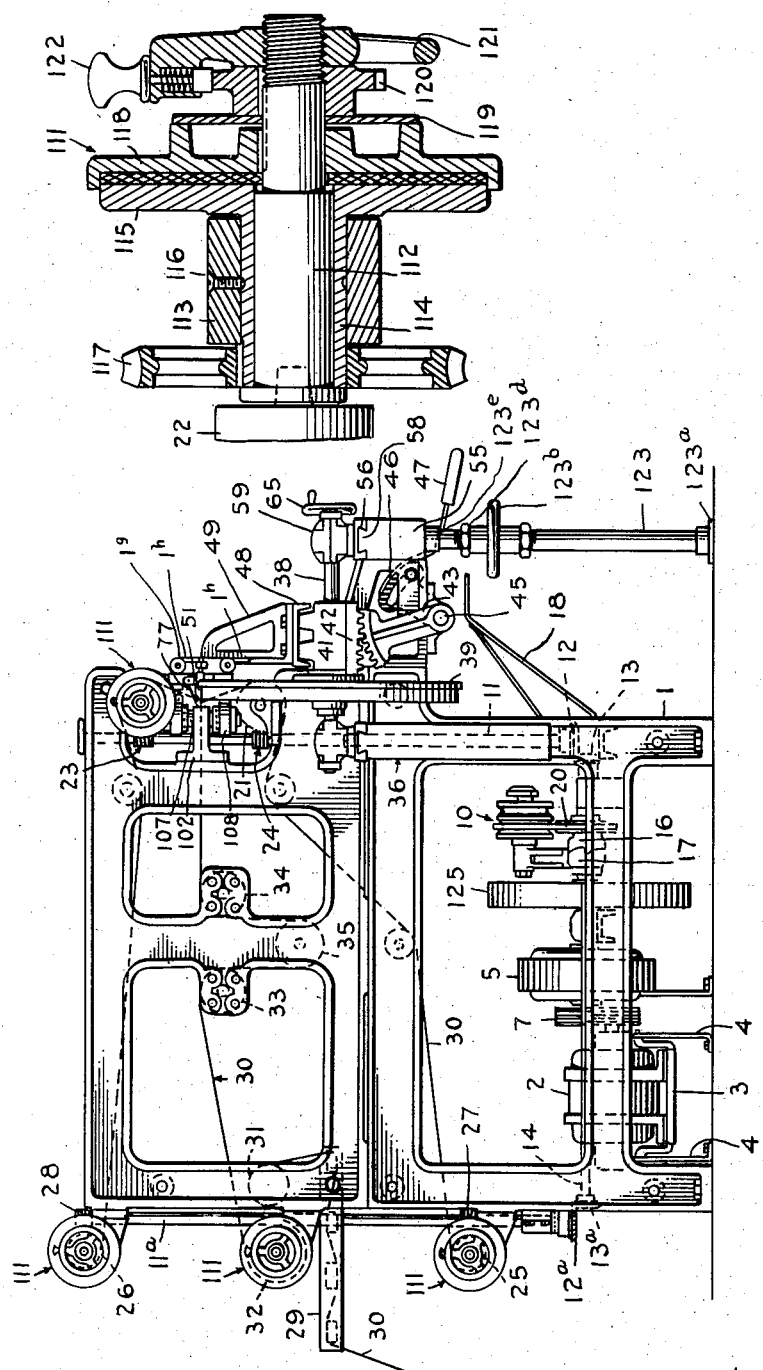
INVENTOR,
WOODRUFF T. SULLIVAN
ATTORNEYS

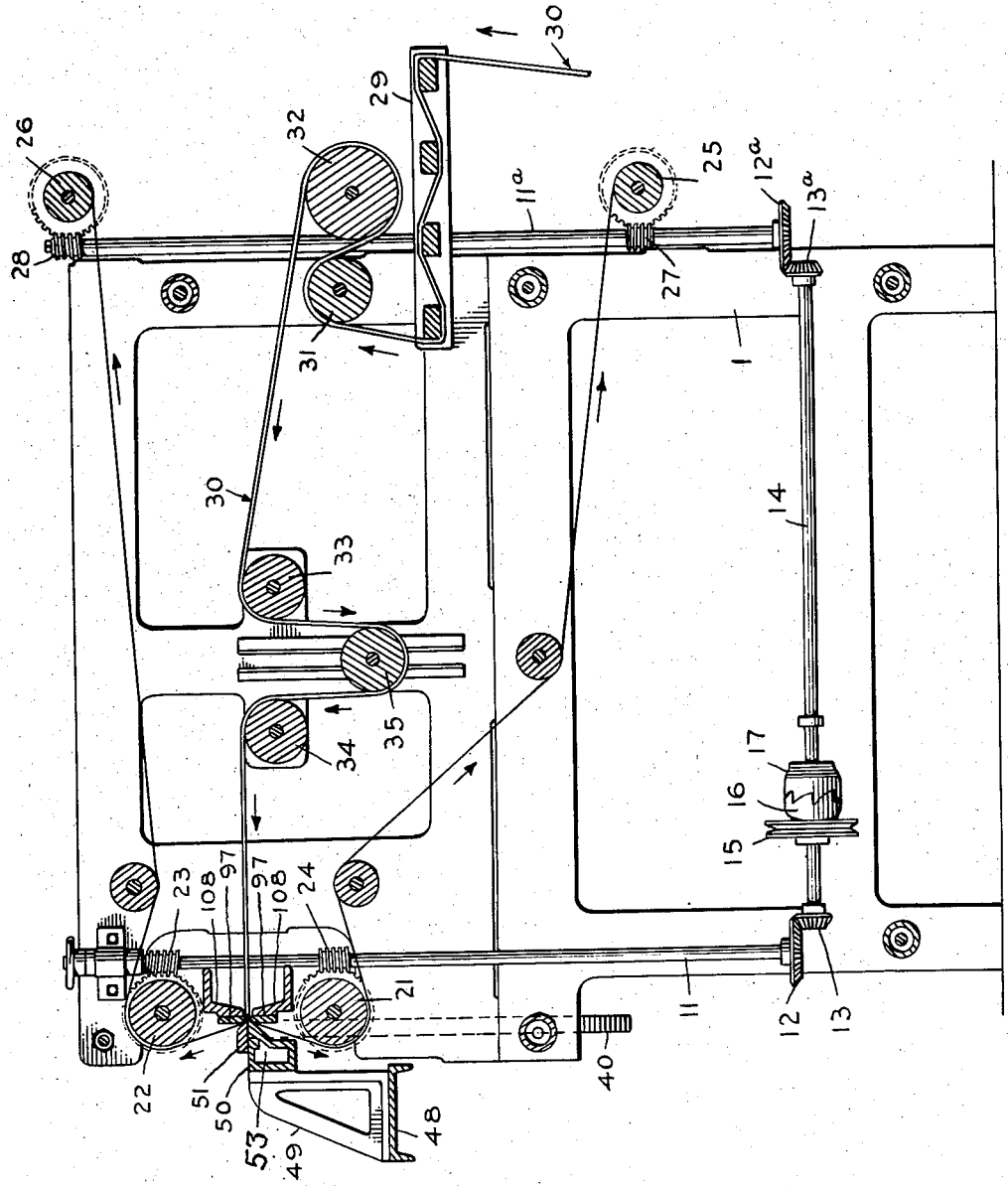

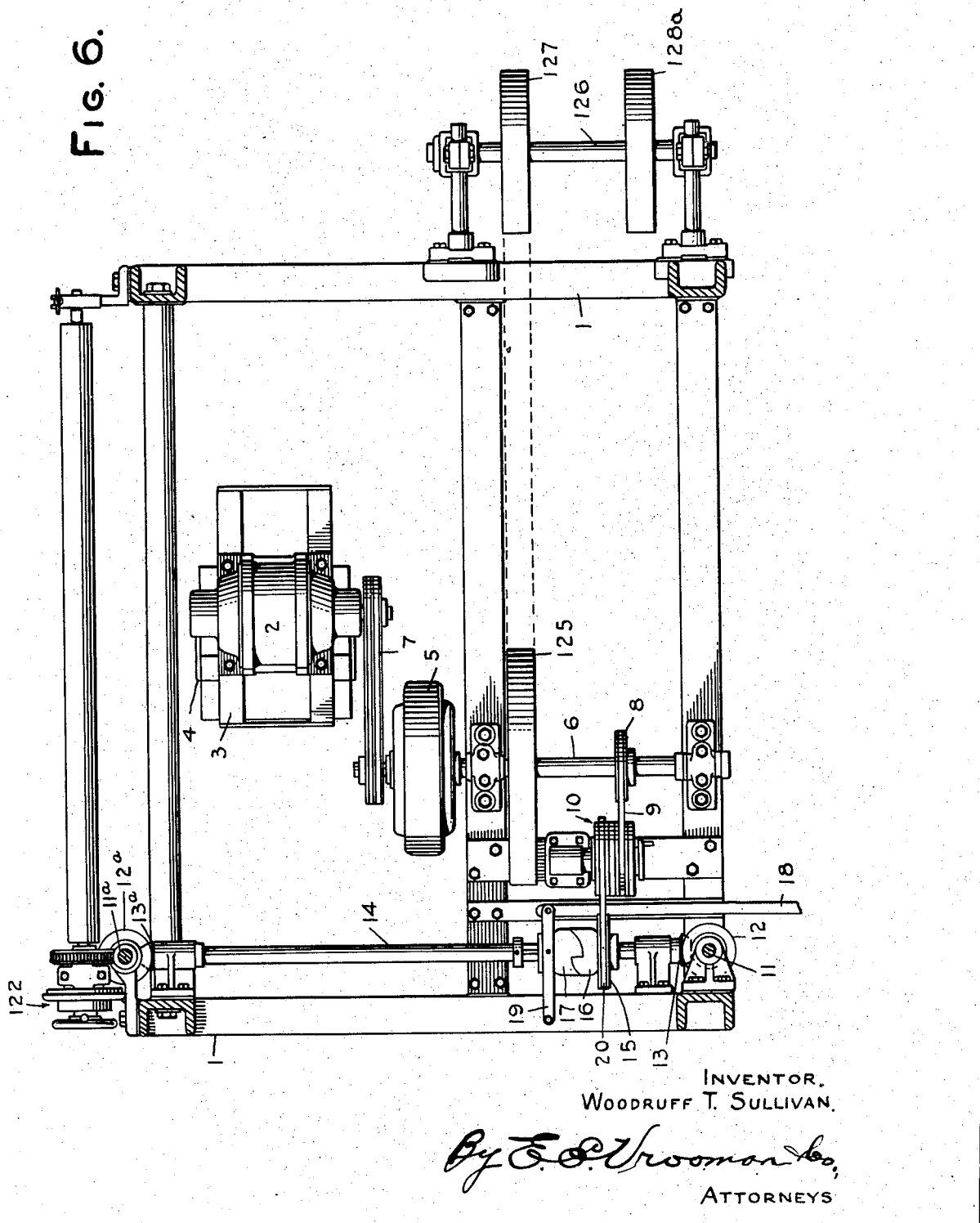

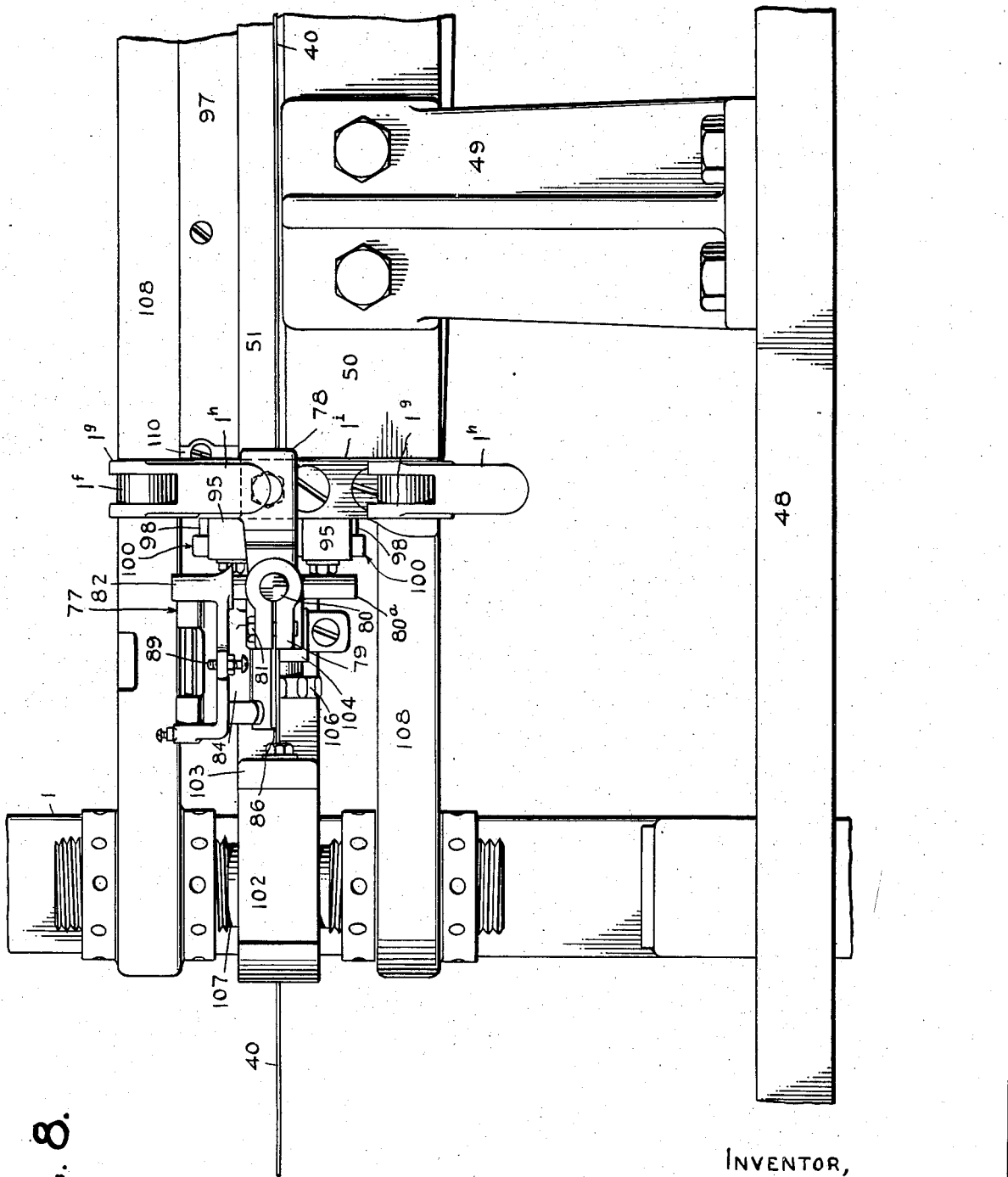

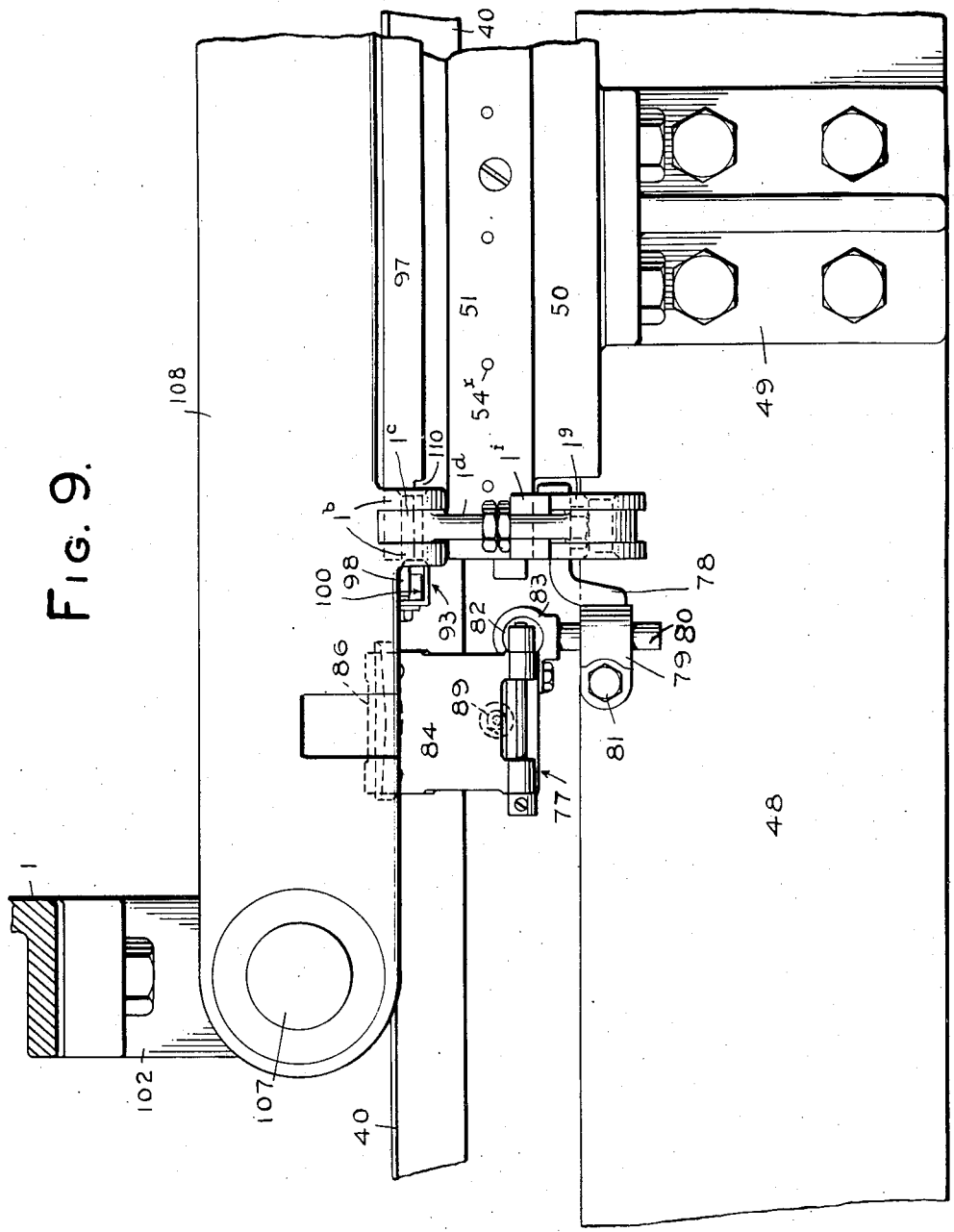

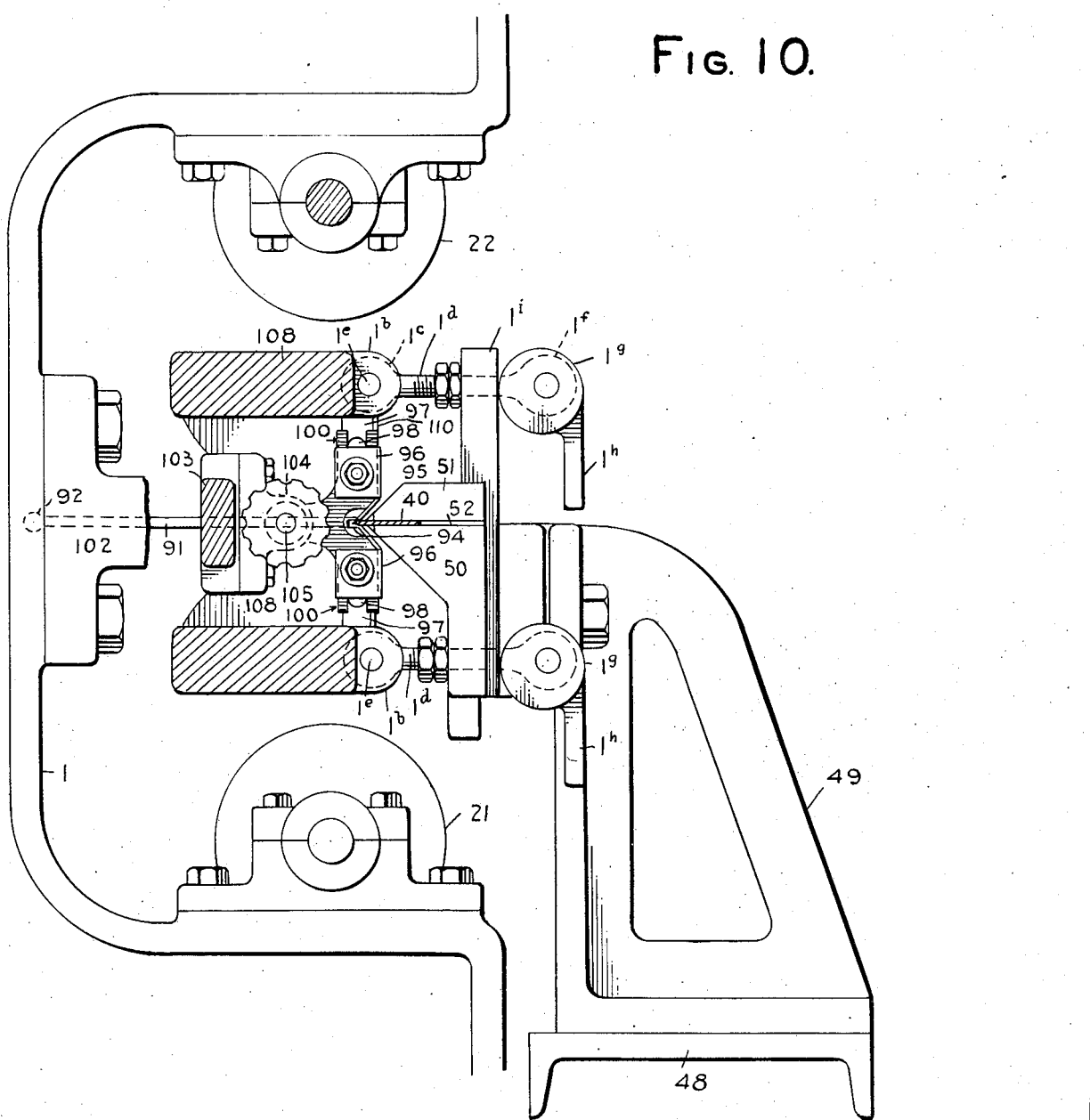

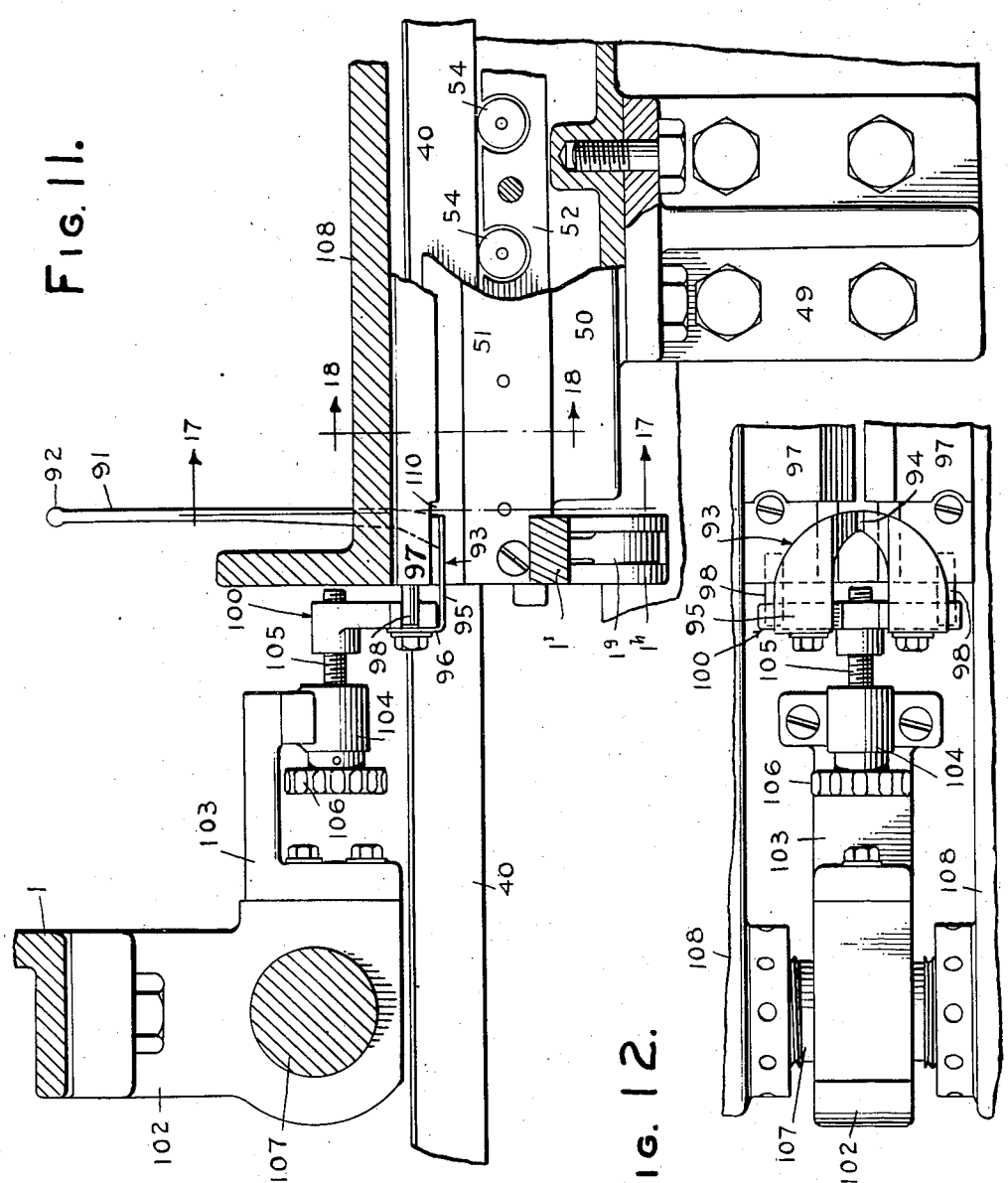

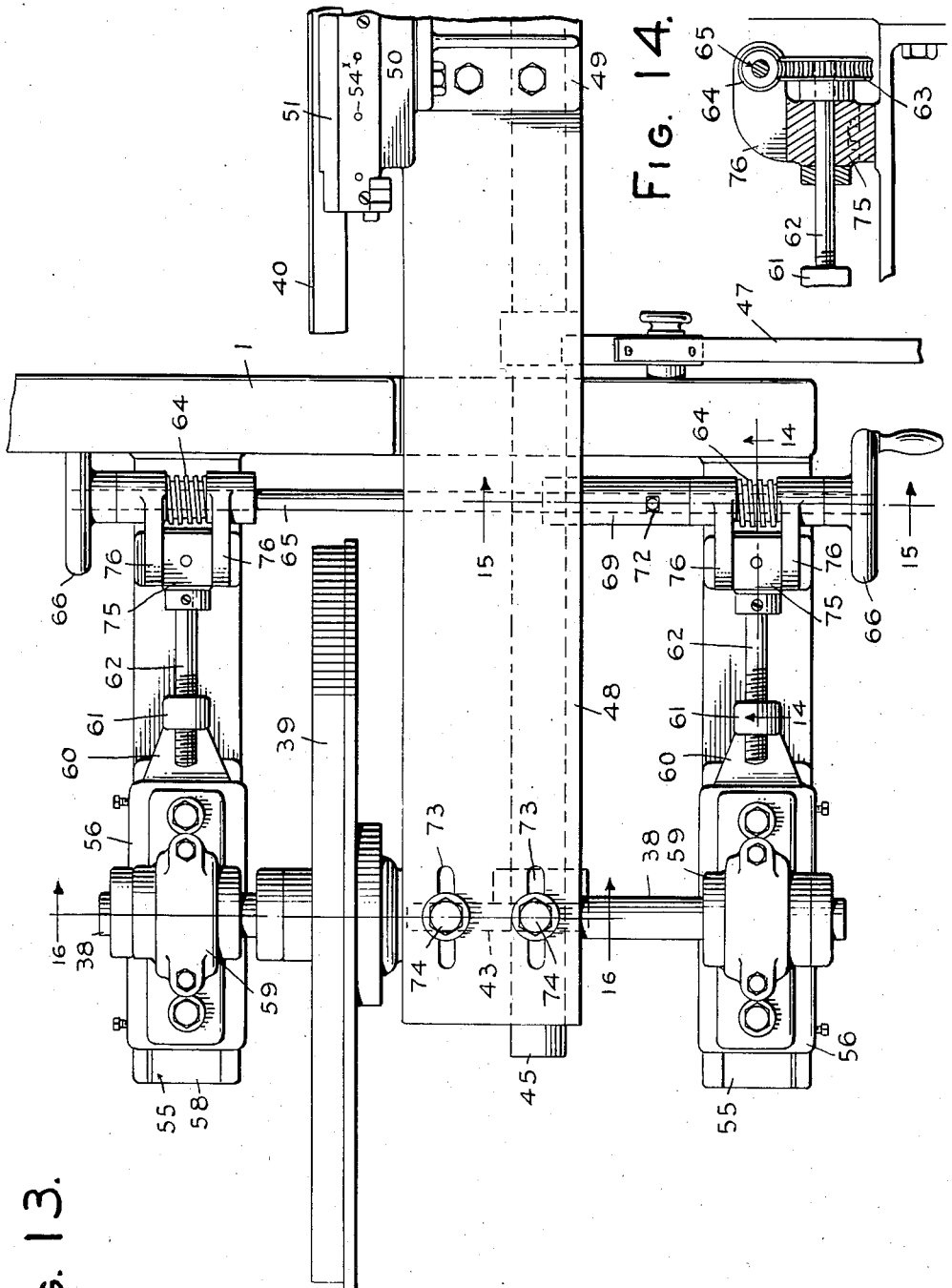

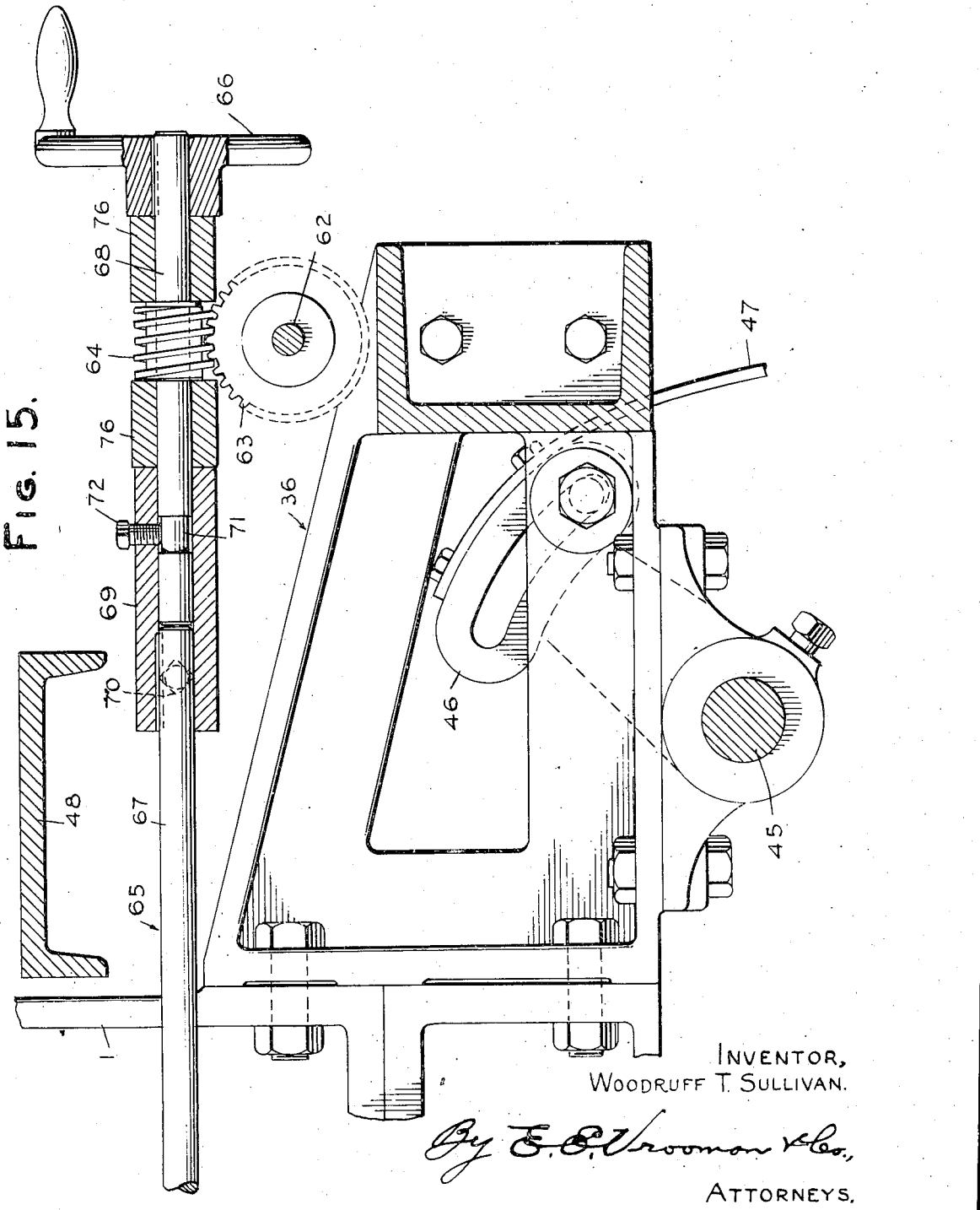

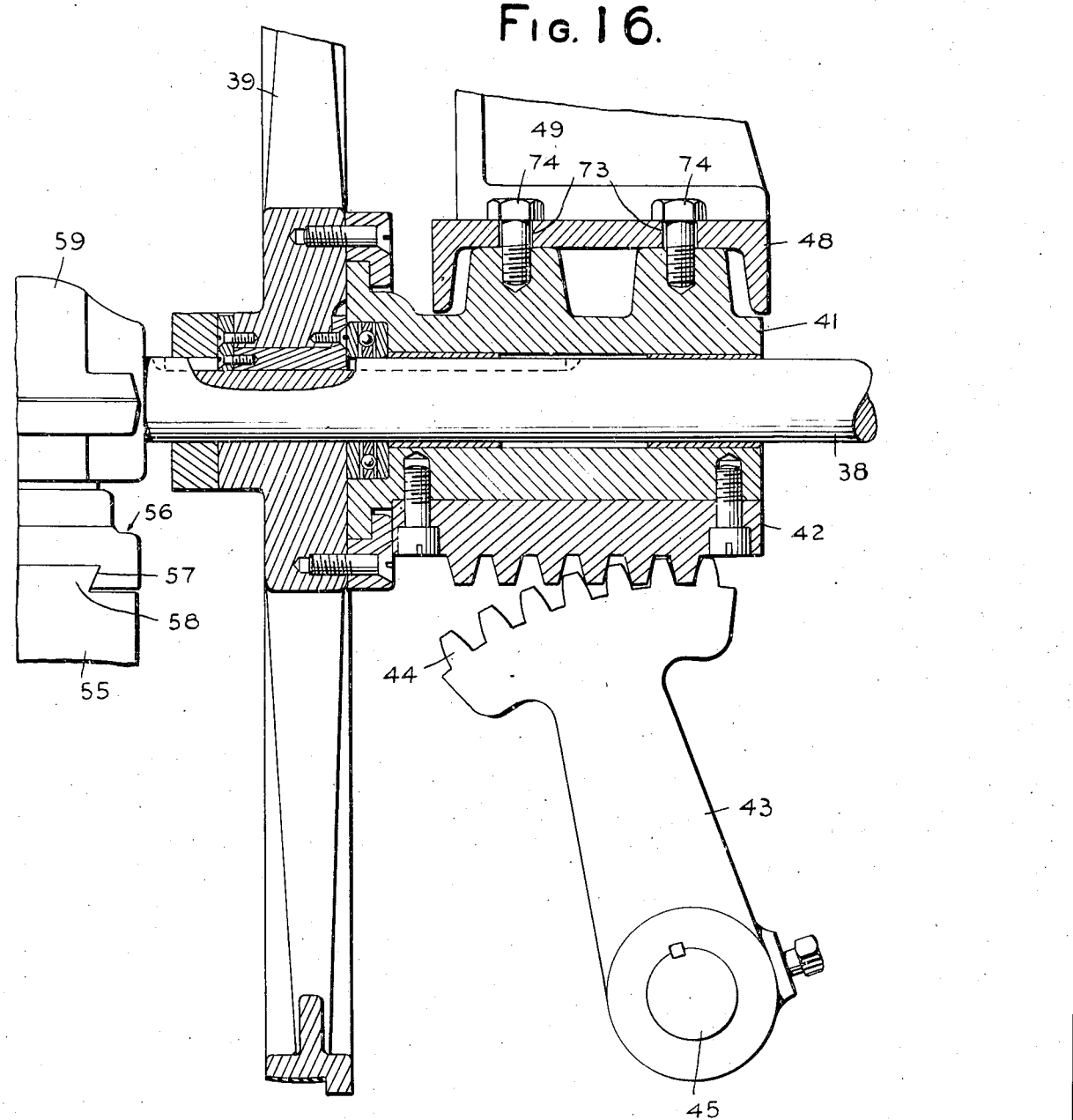

July 19, 1949.  W. T. SULLIVAN  2,476,780
MACHINE FOR CUTTING DOUBLE PILE FABRICS
Filed Dec. 11, 1947  16 Sheets-Sheet 15

INVENTOR,
WOODRUFF T. SULLIVAN

By E. E. Vrooman & Co.
ATTORNEYS

July 19, 1949.  W. T. SULLIVAN  2,476,780
MACHINE FOR CUTTING DOUBLE PILE FABRICS
Filed Dec. 11, 1947  16 Sheets-Sheet 16
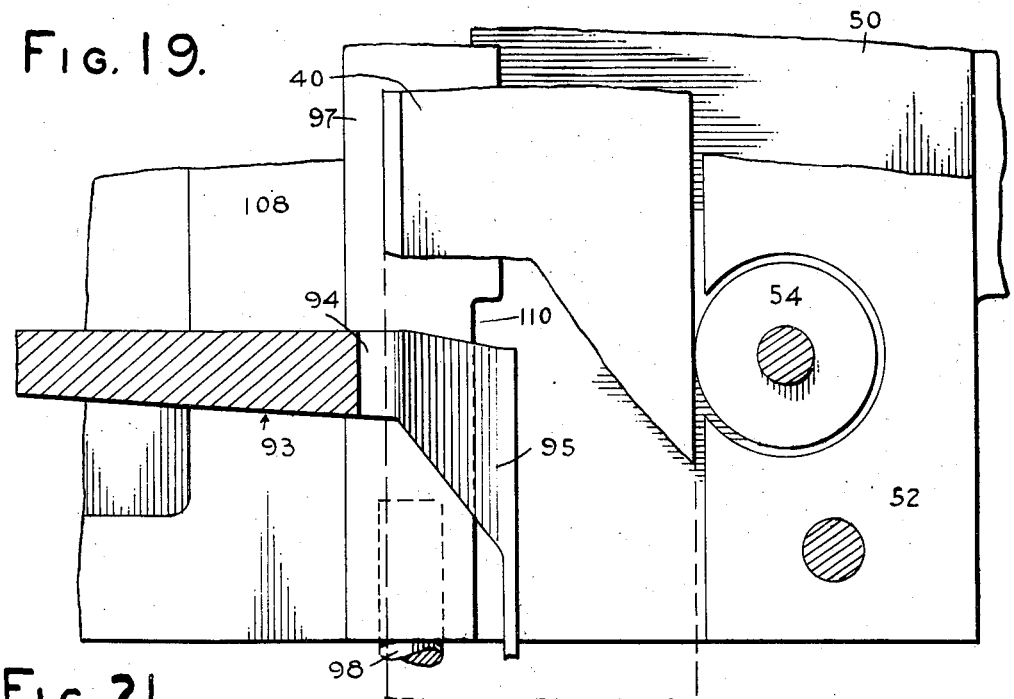
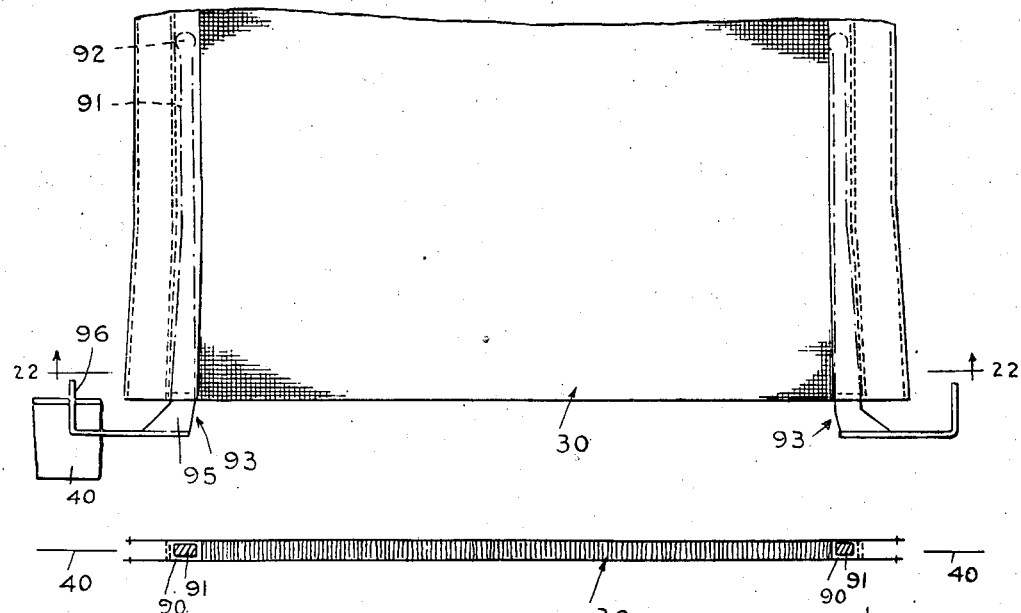
INVENTOR,
WOODRUFF T. SULLIVAN
ATTORNEYS.

Patented July 19, 1949

2,476,780

UNITED STATES PATENT OFFICE 2,476,780

MACHINE FOR CUTTING DOUBLE PILE FABRICS

Woodruff T. Sullivan, Norwich, Conn., assignor to J. B. Martin Company, Norwich, Conn., a corporation of Delaware Application December 11, 1947, Serial No. 791,020

28 Claims. (Cl. 26—13)

This invention relates to a double velvet or other double pile fabric parting machine.

An object of this invention is the provision of efficient means for cutting apart a double pile fabric by attacking the woven fabric at or near its center between its top and bottom, for the purpose of separating the fabric or cloth into two pieces.

Another object of this invention is the provision of comparatively simple and efficient means for holding a fabric or cloth and cutting the pile thereof by means of preferably a band knife.

A still further object of this invention is the provision in a machine of an efficient temple means, whereby part of the fabric is retained in a transversely stretched or taut condition while a band knife is operating to cut the pile, thereby separating the fabric or cloth into two pieces, and subsequently winding these pieces on separate wind-up rolls located preferably at the rear of the machine.

Another object of this invention is the provision in a velvet parting machine of a band knife arrangement, whereby excellent cutting conditions, or convenient conditions are obtained for observing the cutting action, or threading up the machine.

Another object of this invention is the provision in a machine of this type of a band cutting arrangement, which is adjustable on one extremity for the purpose of obtaining the proper cutting tension in the band knife to give desired cutting results.

Another object of this invention is the provision in a machine of this type of a band arrangement which is adjustable so that the band knife may be made to track properly.

A further object of this invention is the provision in a machine of this type of pile bars which may be adjusted for various widths of fabric as well as to align the central point between them with the cutting edge of the knife band.

Another object of this invention is the provision of an efficient sharpening device for the band knife in a double pile or velvet parting machine.

A still further object of this invention is the construction of an efficient and comparatively inexpensive velvet or pile parting machine in which a novel temple device is employed for holding the fabric in an extended under tension condition during the cutting action.

Another object of this invention is the provision of a pile bar arrangement whereby adjustment may be made to vary the width between the pile bars for the purpose of accomodating various thicknesses of fabric or obtaining the proper alignment of the pile bar opening and the cutting point of the band knife.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Fig. 3 is a view in elevation of the right-hand side of the machine, while

Fig. 4 is a similar view of the left-hand side.

Fig. 5 is a partial, vertical, central sectional view of the machine.

Fig. 6 is a horizontal, sectional view taken on line 6—6, Fig. 3, looking in the direction of the arrows.

Fig. 7 is an enlarged, fragmentary end view of the machine, showing particularly the band knife and the sharpening means therefor, while Fig. 8 is partly an enlarged, front elevation view thereof.

Fig. 9 is an enlarged, fragmentary top plan view of the machine, showing particularly the knife device.

Fig. 10 is a fragmentary view of the machine, showing part in elevation and part in vertical section.

Fig. 11 is an enlarged fragmentary view of the machine showing particularly the temple device and part of the band knife structure.

Fig. 12 is a front elevated view of a portion of the machine, showing particularly the temple device.

Fig. 13 is an enlarged fragmentary plan view, showing particularly the adjusting means for the band knife.

Fig. 14 is a vertical, sectional view taken on line 14—14, Fig. 13, and looking in the direction of the arrows.

Fig. 15 is an enlarged sectional view taken on line 15—15, Fig. 13, and looking in the direction of the arrows.

Fig. 16 is an enlarged sectional view taken on line 16—16, Fig. 13, and looking in the direction of the arrows.

Fig. 19 is an enlarged fragmentary view of the machine, showing part of the temple device and the band knife.

Fig. 20 is an enlarged, vertical sectional view of one of the tightening devices for some of the rolls.

Fig. 21 is a diagram, showing a piece of the fabric or cloth with the temple fingers shown in dotted and dashed lines therein, while Fig. 22 is a sectional view taken on line 22—22, Fig. 21.

Fig. 23 is a plan view of one of the temple devices, while

Fig. 24 is a front view of the same.

Fig. 25 is a bottom plan view of the temple device.

Fig. 26 is a side view in elevation of a casting forming part of the temple device, while Fig. 27 is a front view thereof.

Figure 1:
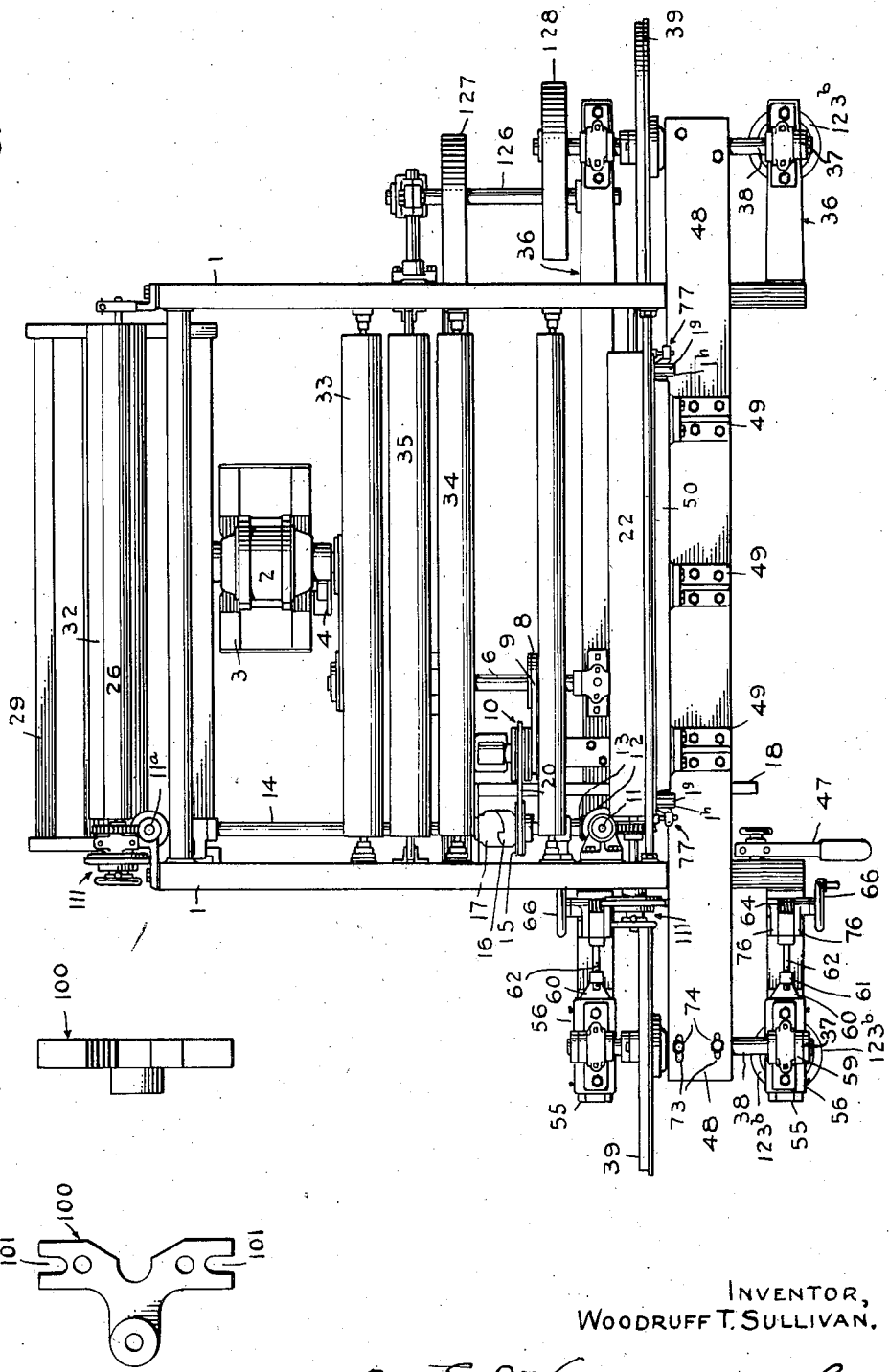
Fig. 1 is a top plan view of a machine constructed in accordance with the present invention.

Referring to the drawings, in which the preferred embodiment of this invention is illustrated, 1 designates a suitable frame upon which is positioned the major portion of the elements of this machine. A motor 2 is supported upon a cradle 3 which is mounted upon vertical brackets 4—4, Fig. 4. Therefore, the motor 2 is capable of a slight swinging movement. Speed reduction means 5 is provided on shaft 6. Motor 2 is connected to the speed reduction means 5 by means of belts 7. On shaft 6 is mounted power pulley 8. A belt 9 is mounted on pulley 8, and is also mounted on the speed jack 10, Fig. 6. A vertical shaft 11, Fig. 5, has a bevel gear 12 on its lower end which meshes with bevel gear 13; gear 13 is fixedly secured to shaft 14, which shaft has a pulley 15 and clutch section 16 loosely mounted thereon, whereby when sliding clutch member 17 is meshing with clutch section 16, the shafts 11 and 14 will be rotated. By means of an operating arm 18 and link 19, the clutch section 17 can be operated for throwing it into and out of mesh, at the will of the operator. A suitable belt 20 is mounted on the speed jack 10 and the pulley 15. At the rear end of the machine there is a second vertical shaft 11a which has at its lower end a bevel gear 12a meshing with bevel gear 13a on shaft 14. Take off rolls 21 and 22 are located at the front of the machine, and these rolls are driven by worms 23 and 24 on shaft 11. Wind-up rolls 25 and 26 are driven by worms 27 and 28, respectively, on shaft 11a. Tension bars 29 are suitably supported upon frame 1, Fig. 5, and the fabric or cloth 30 is threaded over these bars 29 and then around rolls 31 and 32 to central rolls 33, 35, and 34. From roll 34 the double fabric is passed to the temple devices where it is cut into two parts, as will be hereinafter specifically described, and then the cut or severed fabric has its two parts passing over rolls 21 and 22, and thence are directed to take-up rolls 25 and 26, upon which they are wound.

Figure 2:
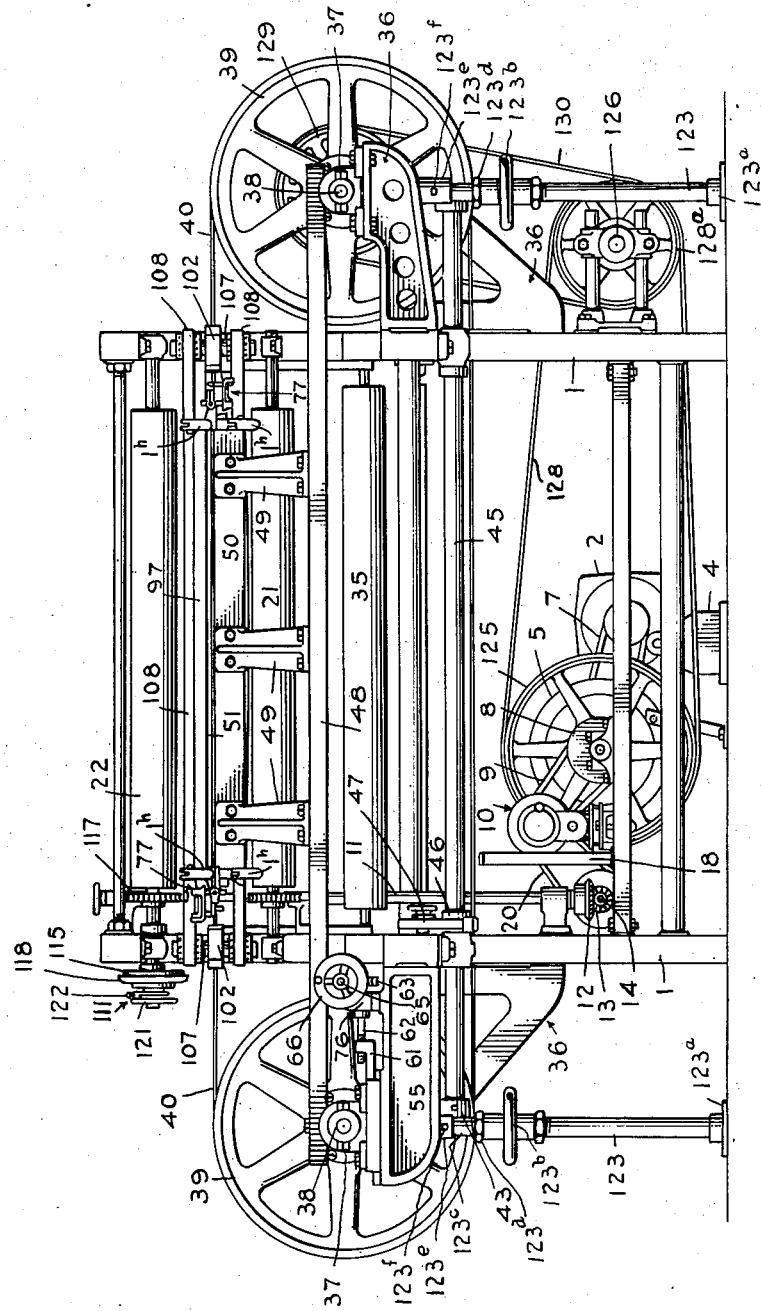
Fig. 2 is a view in front elevation of the machine.
Figure 17:
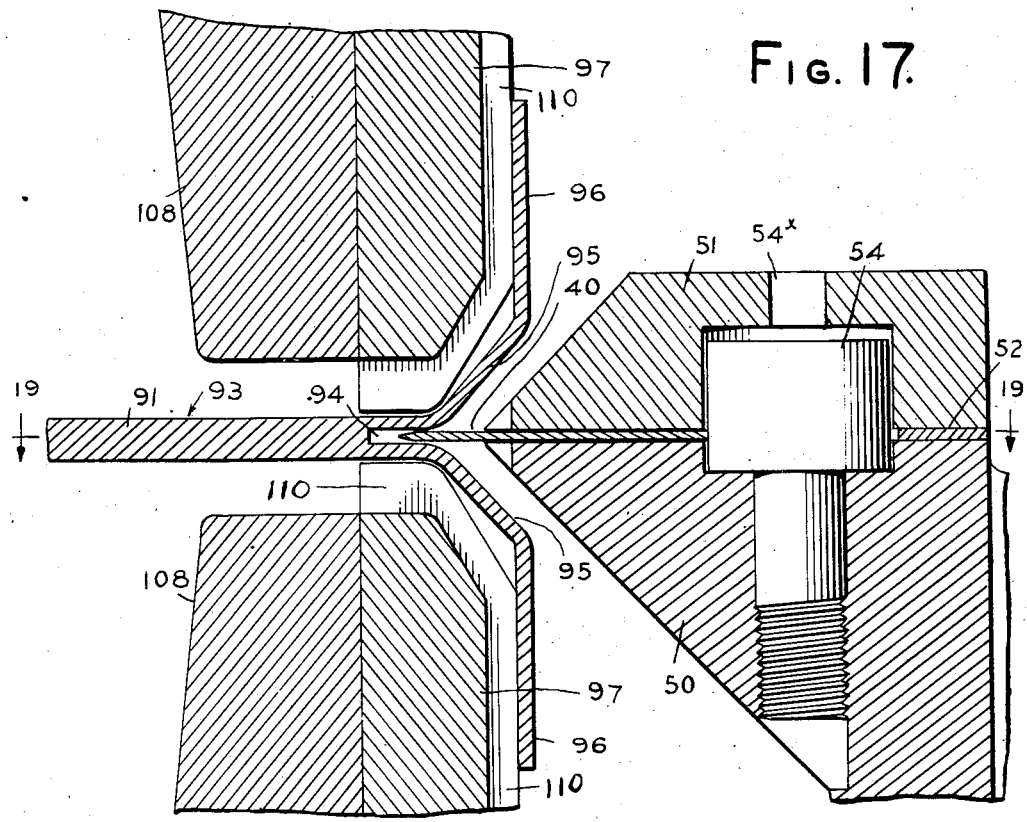
Fig. 17 is an enlarged sectional view taken on line 17—17, Fig. 11, and looking in the direction of the arrows.
Figure 18:
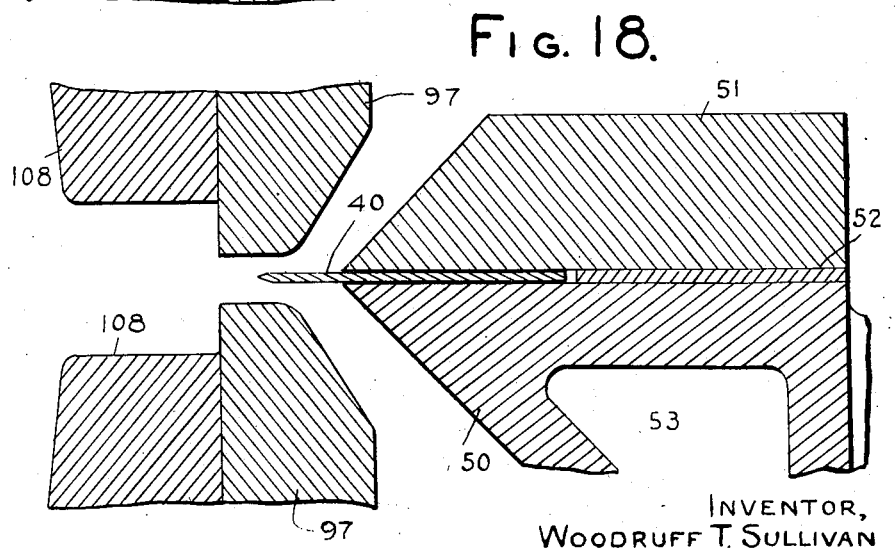
Fig. 18 is an enlarged sectional view taken on line 18—18, Fig. 11, and looking in the direction of the arrows.

On frame 1 there are four horizontal brackets 36, Fig. 2, that carry suitable bearings 37, in which bearings are journaled horizontal shafts 38. Slidably secured to these shafts 38 are flanged pulleys 39. These pulleys carry the band knife 40. Referring to Fig. 16: on shaft 38 is mounted a bearing 41; this bearing 41 has a rack 42 bolted to bearing 41. Rocker arm 43 has teeth 44 that mesh with the rack 42. This rocker arm is fixedly secured on shaft 45. Fixedly secured to shaft 45 is a slotted segment 46 (Fig. 15), which segment 46 is provided with an operating handle 47. By the operator manipulating handle 47, the bearing 41 can be adjusted longitudinally on shaft 38, whereby the band knife 40 can be brought into or out of cutting position with reference to the cutting of the pile of the double fabric or cloth in the machine. On the bearings 41 there is mounted an angle bar 48; this angle iron or bar is bolted to the top of the bearings 41 (Fig. 16). Fixedly secured to the angle iron 48, constituting a carriage, are vertical brackets 49. Secured on the upper ends of the brackets 49 is a lower guide 50 (Fig. 17) with an upper guide 51 mounted thereon. The band knife 40 travels partly between the guides 50 and 51. A plate 52 spaces the guides 50 and 51, the thickness of the plate 52 being slightly greater than the thickness of the band knife 40, whereby the band knife can have free passage between the guides 50 and 51, without unnecessary play. The lower guide 50 is provided with a compartment 53, Fig. 5, in which water may be circulated. Rollers 54 are provided, which bear against the rear edge of the band knife 40, Fig. 11. These rollers 54 do not come in contact with the water. The action of the water is only to keep the guide 50 in a cool condition. This eliminates a heating condition between the knife band 40 and the bottom guide 50. This coolness is transmitted by the contact of spacer 52 with guide 51 which tends to reduce any heating condition between the top guide 51 and the top of the band knife 40. Of course some of this cool condition is transmitted to the rollers 54 as they are mounted in the lower guide 50 which is being kept cool and does reduce any heating effect produced by contact of the rollers 54 with the band knife 40. Above rollers 54 are oil holes 54*.

From the foregoing, it will be seen that by operating the handle 47 (Fig. 15) the band knife 40 can be adjusted inwardly and outwardly for the purpose hereinafter described.

Referring particularly to Figs. 13 and 15, on the frame 1 there are two right-angle extensions 55 on which are mounted sliding sections 56. These sections have dove-tailed sockets 57 (Fig. 16) that receive dove-tail tenons 58. Sliding sections 56 are provided with bearings 37, in which shaft 38 is journaled. On the inner end of each sliding section 56 is an extension 60; each extension 60 has an upstanding threaded sleeve 61 in which is threaded the shaft 62. Shaft 62 is provided on its outer end with a worm gear 63, which gear 63 meshes with the worm 64 formed on the shaft 65. On the ends of shaft 65 are operating wheels 66, whereby the operator can manipulate said shaft at either end. The shaft 65 comprises two sections 67 and 68, Fig. 15. A sleeve 69 is on the contiguous ends of sections 67 and 68. Section 67 is fixedly secured at 70 to the sleeve 69, while section 68 may revolve freely in sleeve 69. Section 68 is provided with an annular groove 71. A set-screw 72 extends through sleeve 69 into groove 71. By tightening screw 72, the sleeve 69 and the section 68 will rotate simultaneously. When the screw 72 is in a loose or unengaging position, section 68 will not revolve with the sleeve 69. The purpose of this construction is to enable the operator to adjust either end of shaft 38, or both of the same at the one time. The independent adjustment is to throw the pulley 39 if necessary into or out of alignment position so that the knife band 40 may be made to track successfully. The coupled adjustment is to obtain the proper tension for the knife band 40.

When the band knife requires adjustment, because of its length, this will necessitate a slight adjustment of the angle bar or iron 48, with respect to the bearing 41, and therefore elongated and over-size slots 73 are provided (Fig. 13), with the bolt screws 74 extending there-through. When the desired adjustment has been obtained, of the carriage, constituted by the angle bar 48, the bolt screws 74 may be tightened, thereby retaining the band knife in an excellent operating condition on the pulleys 39.

It is to be noted that the shafts 62 (Figs. 13 and 14) are journaled in auxiliary bearings 75, each of which auxiliary bearings 75 is provided with ears 76 in which is journaled the shaft 65.

Figure 7:
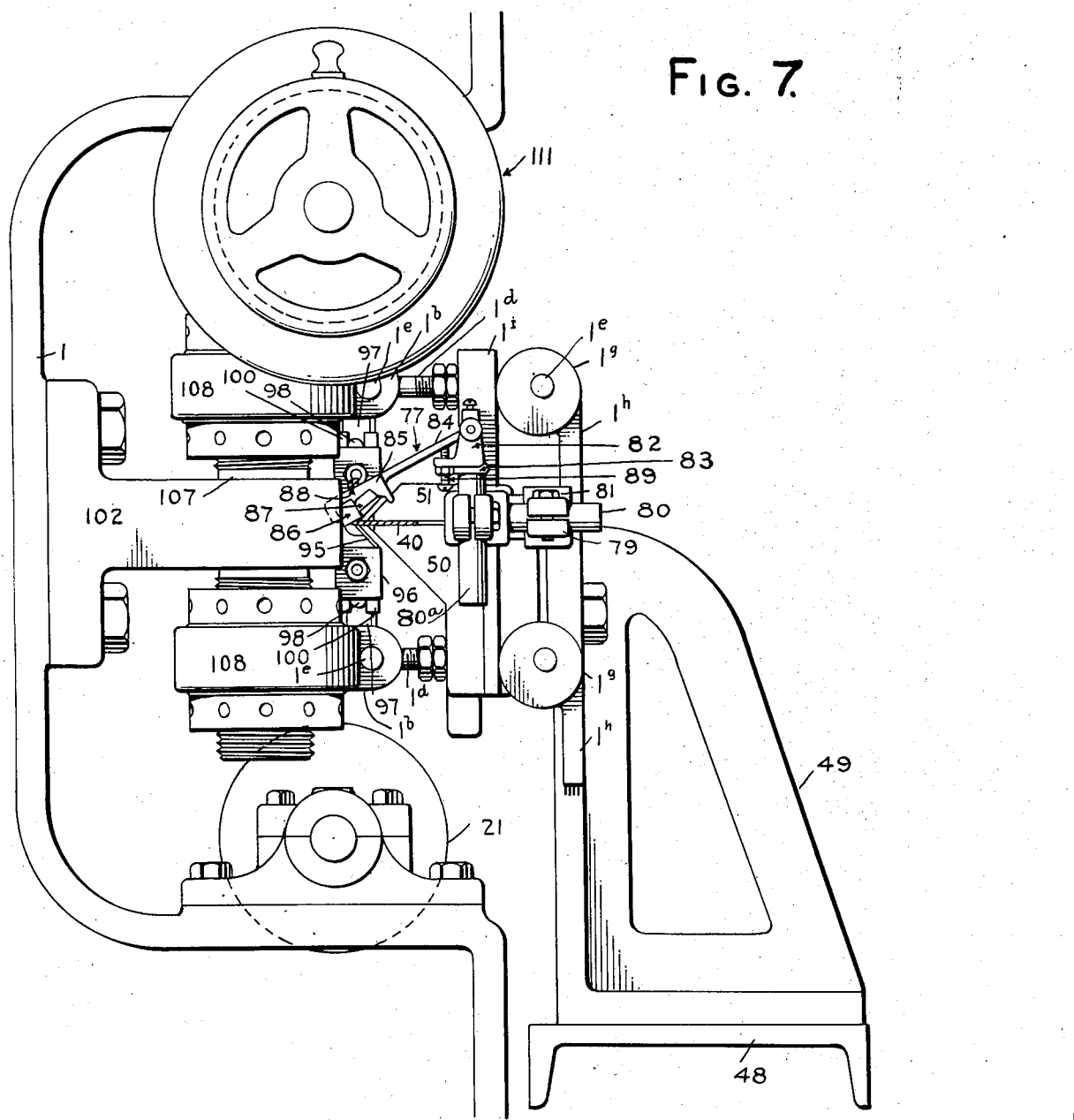

A sharpening device 77 is provided for the band knife 40, which comprises an arm 78, Fig. 9, that has a pair of ears 79, between which ears is a horizontally slidable shaft 80. The shaft 80 can be held in an adjusted position upon tightening bolt 81. On the outer end of shaft 80 is mounted a shaft 80a which may be adjusted vertically. On the upper end of shaft 80a is a frame 82. On the opposite end of the machine an identical arrangement (not shown) is used except that it is mounted under the knife blade of the knife band 40 so that the honing stone can attack the under side of said knife blade. In this case a light spring (not shown) is used to hold the stone against the knife band 40. This frame 82 seats on a plate-like base 83, Fig. 7, and within frame 82 is pivotally mounted plate-like arm 84. Arm 84 is provided on its lower end with a holder 85, in which is seated a suitable stone 86, this stone 86 being held in place by a wedge 87, the wedge being carried by adjustable screw 88. The stone or sharpening unit normally bears on the cutting edge of the band knife, thereby keeping it very sharp. An adjustable screw 89 is employed for controlling the gravity pressure of the stone 86 on the cutting edge of the band knife 40.

It is very important that the double fabric or cloth be held in a transversely stretched or taut condition at the time the band knife severs the pile. Therefore, the fabric or cloth 30 is provided with two pockets 90, formed near the side edges of the cloth as shown in Figs. 21 and 22. These pockets are adapted to receive the temple fingers 91. Each temple finger 91 is provided on one end with a ball 92 for facilitating the entrance of the finger into the pocket. There are two of the temple devices 93 employed, and it will only be necessary to describe one, as the two are similar in construction. Referring to Figs. 23 to 25: the temple device comprises the temple finger 91 which has at one end a slot 94 and two outwardly-extending arms 95, 95, each arm terminating in a right-angle ear 96. On the pile bars 97 (Fig. 11), there are outwardly-extending pins 98. Slots 99 are for screws, for fastening temple device 93 to bracket 100. The bracket 100 is provided, which has bifurcated ends 101 into which pins 98 extend. A bracket 102 is suitably supported; a second bracket 103 is bolted to bracket 102 and bracket 103 has a hub 104 through which extends threaded bolt 105. A wheel-like grip 106 is on bolt 105, whereby the casting 100 can be adjusted to control the positioning of the temple device 93, to obtain the desired stretching result on the fabric 30 that is being severed. The bracket 102 is mounted on an adjusting screw 107, whereby a further adjustment may be obtained upon the temple device 93. There are two pile bar supports 107 (Fig. 17), carrying pile bars 97. Each pile bar 97 is provided on its outer face with a groove 110 in which one section of the double fabric 30 passes after the fabric or cloth has been severed into two parts. After passing through the grooves 110, the separated sections of the fabric pass over the rolls 21 and 22 (Fig. 5), and thence on to the wind-up rolls 25 and 26. Referring particularly to Fig. 21, the outer edges of the pockets 90 hug closely the outer portions of the temple fingers 91 to increase the tension or stretching of the fabric at the approach to, as well as at the time of action of, the band knife on the pile of the fabric.

The knife band travels across the machine in its guides which are rigidly mounted and cannot be materially changed. The pile bars are adjustably mounted at their ends, and the slot across the machine between them can be varied both as to the width and for parallelism with the knife band 40. In this manner the slot where the cutting takes place can be accurately positioned all the way across the machine with respect to the permanent position of the knife band 40.

After the above condition has been met the temple devices 93 act to produce the proper side tension. The slots in the casting 100 are provided to allow the pins 98 to ride up or down if adjustment is made in the pile bar or bars without disturbing the position of the temple devices 93. The pins and slots arrangement of course prevent the temple devices 93 from rotating.

Referring to Figs. 7, 8, 9 and 10: On the pile bar holders 108 are located two sets of projecting ears 1b, between each is positioned the hub 1c on one end of the eye bolt 1d and rotatably mounted on the pin 1e. On the other end of the eye bolt 1d is located a similar hub 1f positioned between two hubs 1g of the cam handle 1h on the pin 1e. The eye bolt may be swung out of position or into position as shown on Fig. 10, passing into a slot provided in the clamping piece 1i which is fastened to the upper guide 51 and the lower guide 50.

Stop and locking nuts are provided to limit the movement of the carriage. It will be noted that the locking device below is substantially the same as the one above just described. There is a set of locking devices near each end of the knife band guides.

It will be seen that when the knife band arrangement has been moved up into operating position the locking eye bolts may be rotated into position and by means of the cam handles, locked in position. The advantage of this arrangement is that it makes the cutting structure and the fabric holding structure practically one solid mass during the cutting operation, thus minimizing the effect of any vibration that may be present.

On one end of each of the rolls 22, 25, 26 and 32 is a tightening device 111, Fig. 20. This tightening device includes a roll, such as 22, that has a portion extending into the stub shaft 112. On this stub shaft 112 is a bearing 113, carried by the sleeve 114 of the disc 115. 116 is an oil hole. Friction disc 115 is clamped in a fixed position in bearing 113 and the position which gear 117 would occupy is taken by a collar. The roll not being driven, the friction plate is held stationary in its bearing and the pull of the cloth coming off of the roll is subject to the friction created by adjustment between 111 and 115. Section 118 is on a portion of stub shaft 112, this section 118 being adapted to receive section 115. A washer-like collar 119 is on the stub shaft 112 against the outer portion of the section 118. A sliding tooth wheel 120 is keyed on stub shaft 112. A suitable friction disc is between sections 115 and 118, Fig. 20. An adjustable wheel 121 is on the outer threaded end of stub shaft 112; this wheel 121 carries a spring catch device 122. By pulling outwardly on catch device 122, the operator can rotate wheel 121, to obtain the desired adjustment, and then upon releasing the catch device 122, it will engage the tooth wheel 120, retaining the device in the desired adjusted position. By this tightening device 111, the desired braking action can be obtained with respect to any one of the rolls specified, whereby the frictional resistance of the roll, or rolls, upon the fabric or cloth 30 is controlled.

The proper tension is a very important requisite for successful operation of this machine, especially with flimsy material. Lengthwise tension is obtained by the drag roll 22 and dancer roll 35 and the friction arrangement, (just described with reference particularly to Fig. 20), per the tightening device 111 that is applied to the rolls aforesaid. However, this is not usually enough, so side tension is provided in the nature of the temple devices.

Referring to Fig. 2: An upright shaft 123 is mounted vertically in the floor plate 123ª. The upper end of shaft 123 is threaded right hand and enters the lower hub adjusting hand wheel 123ᵇ. Shaft 123ᶜ is left hand threaded on its lower end and enters the upper hub of the adjusting hand wheel 123ᵇ. The hand wheel 123ᵇ may be permanently checked by either of the lock nuts 123ᵈ. The upper end of the shaft 123ᶜ enters the hub 123ᵉ which is part of the bracket 55. The hub 123ᵉ has the set screw 123ᶠ which impinges on a flatted portion of the upper shaft. It is apparent that by rotating the hand wheel in the proper direction the lower shaft 123 will be drawn into the hand wheel 123ᵇ and the upper shaft will be drawn into the hand wheel. This may be continued until the upper shaft has been completely withdrawn, leaving a sizable opening between the top shaft 123ᶜ and the hand wheel 123ᵇ. This opening allows the removal of the band knife 40 from the machine.

This arrangement provides also a suitable adjustable support for the extended brackets 36.

On shaft 6 (Fig. 6) is a belt wheel 125, and on shaft 125 is a belt wheel 127. The belt 128 is on belt wheels 125 and 127, whereby when the machine is operating, the shaft 126 will be rotated. A second belt wheel 128ª is on shaft 126. A belt wheel 129 is on shaft 38, carrying pulley 39, and a belt 130 is on belt wheels 128 and 129, whereby when the machine is operating, the flanged pulleys 39 will be operated; these pulleys 39, as hereinbefore described, carry the band knife 40.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a machine of the class described, the combination with a frame, of adjustable temple means on said frame, feeding means on said frame for supplying a double pile fabric to said temple means, and an endless cutting means having a portion in said temple means, whereby fabric passing over said temple means will be cut into two parts.

2. In a machine of the class described, the combination with a frame, of horizontally-adjustable temple means on said frame, feeding means on said frame for supplying a double pile fabric to said temple means, and a band knife supported upon said frame and provided with a portion extending into said temple means.

3. In a machine of the class described, the combination with a frame, of a pair of temple devices, means supporting said temple devices on said frame, each temple device including a temple finger, means for feeding a fabric to said temple devices, and cutting means on said frame and having a portion in both of said temple devices.

4. In a machine of the class described, the combination with a frame, of a pair of temple devices, each temple device including a finger having a ball at one end and a slot at its other end, means supporting said temple devices on said frame, means for feeding a cloth to and over said temple devices, and cutting means on said frame working in the slots of said temple devices.

5. In a machine of the class described, the combination with a frame, of a pair of temple devices, means supporting said temple devices on said frame, each temple device comprising a finger slotted at one end and provided at its other end with a ball, ears on said slotted end, means on said frame for feeding a fabric to said temple devices, and cutting means on said frame and having portions in said slotted ends of the temple devices.

6. In a machine of the class described, the combination with a frame, of pile bars and means supporting the same upon said frame, each pile bar provided at each end with pins, temple devices on said pins, means for feeding a fabric to said temple devices, and means cooperating with said temple devices for separating said fabric into two parts.

7. In a machine of the class described, the combination with a frame, of pile bars and means supporting said pile bars upon said frame, each of said pile bars provided at each end with outwardly extending pins, castings each having slotted ends, said pins on said pile bars in the slotted ends of said castings, temple devices against the slotted ends of said castings, adjusting screws and means supporting said screws upon said frame, said adjusting screws extending through a portion of said castings, means for feeding a cloth to said temple devices, and said frame carrying cutting means for cutting a cloth into two parts as it passes over said temple devices.

8. In a machine of the class described, the combination with a frame, of temple devices, means supporting said temple devices upon said frame, each temple device comprising a temple finger provided with a slotted end and with outwardly extending arms on said slotted end, each arm provided with an ear, said ear provided with an elongated slot, means on said frame for feeding a double pile fabric to said temple devices, and cutting means traveling in the slotted ends of said temple devices.

9. In a machine of the class described, the combination with a frame, of temple means on said frame, flange pulleys and means supporting said pulleys on said frame, a band knife on said pulleys and having portions passing through portions of said temple devices, and means for passing a double pile fabric over said temple devices in the path of said band knife, whereby the fabric is separated into two parts.

10. In a machine of the class described, the combination with a frame, of pile bar supports and means supporting said supports upon said frame, pile bars against said supports, said pile bars provided with fabric-receiving grooves, temple means between said pile bars, said temple means provided with means for directing parted sections of a fabric into said grooves, and cutting means supported upon said frame and having a portion mounted to operate in part of said temple means, whereby a double fabric will have its pile severed as said fabric passes over said temple means and into said grooves.

11. In a machine of the class described, the combination with a frame, of temple means supported upon said frame, a lower and an upper guide supported upon said frame and positioned contiguous to said temple means, a band knife and means supporting the same upon said frame, said band knife traveling between said lower and upper guides, and said band knife having a portion also traveling between parts of said temple means.

12. In a machine of the class described, the combination with a frame, of a lower hollow guide and means supporting the same upon said frame, an upper guide and means spacing the same from said lower guide, said guides provided with friction rollers, said rollers having portions communicating with the hollow part of said lower hollow guide, a band knife positioned between said guides and having its inner edge in contact with said rollers, temple means on said frame and straddling a part of said band knife, and means for feeding a fabric or cloth to said temple means and in the path of said band knife.

13. In a machine of the class described, the combination with a frame, of a hollow guide provided with rollers carried by said frame, an upper guide over said rollers and spaced from said hollow guide, a traveling knife between said guides and in contact with said rollers, and means on said frame for directing a double pile fabric into contact with said traveling knife.

14. In a machine of the class described, the combination with a frame, of an angle arm and means supporting said angle arm upon said frame, upstanding brackets on said angle arm, a sectional guide on said brackets, a traveling knife working between the sections of said guide, temple means on said frame contiguous to said sectional guide, and means for directing a double pile fabric to said temple means and over the same, and said traveling knife having portions working in said temple means, whereby said knife will sever a double pile fabric as it passes over said temple means.

15. In a machine of the class described, the combination with a frame, of an adjustable carriage and means supporting said carriage upon said frame, said adjustable carriage provided with a band knife and with knife-guiding means, temple means on said frame contiguous to said band knife and said guiding means, and manually-controlled means for adjusting said carriage with reference to said temple means.

16. In a machine of the class described, the combination with a frame, of temple means on said frame, means for supplying a fabric to said temple means, said frame provided with a pair of extensions, sliding sections on said extension, a shaft journaled in said sliding extension, a flange pulley on said shaft, means for separately adjusting the ends of said shaft, said adjusting means also being capable of adjusting both ends of said shaft jointly, and a band knife mounted on said flange pulley and cooperating with said temple means for severing a fabric.

17. In a machine of the class described, the combination with a frame, of temple means on said frame, means for supplying a fabric to said temple means, a pair of extensions and means supporting said extensions upon said frame, each extension provided on its upper face with a dove-tail tenon, a sliding section provided with a dove-tail socket seating said dove-tail tenon, a shaft and means journaling said shaft upon said sliding section, a band knife carrying pulley slidably mounted upon said shaft, means for manually adjusting said pulley upon said shaft, and a band knife mounted on said pulley and being adapted to enter a portion of said temple means for parting fabric conveyed to said temple means by said fabric supplying means.

18. In a machine of the class described, the combination with a frame, of temple means on said frame, means for supplying double pile fabric to said temple means, a knife band carrying pulley, means on said frame supporting said pulley, means on said frame for adjusting said pulley supporting means both transversely of and longitudinally of said frame, a band knife mounted on said pulley, and said band knife being capable of entering part of said temple means for severing fabric by cutting the pile thereof as fabric passes over said temple means.

19. In a machine of the class described, the combination with a frame, of temple means on said frame, fabric conveying means on said frame and being capable of delivering fabric to said temple means, cutting means in part of said temple means, means for slightly swinging said cutting means in a horizontal plane, and means for bodily, longitudinally adjusting said cutting means.

20. In a machine of the class described, the combination with a frame, of temple means on said frame, means for conveying fabric to said temple means, a shaft and means supporting said shaft upon said frame, a bearing slidably mounted on said shaft, a pulley slidably keyed to said shaft, means connecting said pulley to said bearing whereby the pulley can have rotary movement on said bearing, a rack fixedly secured to said bearing, a rocker arm meshing with said rack, manually-operated means for said rocker arm, whereby the bearing and pulley can be adjusted longitudinally of said shaft, and a band knife mounted on said pulley and having portions traveling in part of said temple means.

21. In a machine of the class described, the combination with a frame, of temple means carried by said frame, means for conveying fabric to said temple means, a shaft and means mounting said shaft upon said frame, a sliding bearing on said shaft, a rotatable pulley on said shaft and connected to said bearing, whereby when said bearing is adjusted said pulley will synchronously be adjusted, an angle iron on said bearing, said angle iron provided with slots, bolt screws in said slots and extending into said bearing, knife guides and means supporting the same on said angle iron, and a band knife mounted on said pulley and having portions working in said temple means and in said knife guides.

22. In a machine of the class described, the combination with a frame, of temple means mounted on said frame, means on said frame for conveying fabric to said temple means, a shaft and means mounting said shaft upon said frame, said shaft provided with a band-knife carrying pulley, a sectional shaft and means supporting said sectional shaft upon said frame, a sleeve on the sections of said sectional shaft, means locking said sleeve upon one of the sections of said sectional shaft, a set screw on said sleeve and being capable of engaging a section of said sectional shaft for locking the same on said sleeve, operating wheels on the ends of said sectional shaft, means adjustably connecting the sections of said sectional shaft to said first-mentioned shaft, and a band knife mounted on said pulley and being capable of cutting fabric as fabric is passed over said temple means.

23. In a machine of the class described, the combination with a frame, of temple means on said frame, means for conveying fabric to said temple means, extensions and means supporting said extensions on said frame, bearings on said extensions, a shaft journaled in said bearings, a pulley on said shaft, means for adjusting said pulley longitudinally of said shaft, a sectional shaft provided with operating wheels on its ends, auxiliary bearings on said extensions, means supporting said sectional shaft on said auxiliary bearings, said sectional shaft provided with worms at said bearings, shafts in said auxiliary bearings, worm-wheels on said last-mentioned shafts, said worm-wheels meshing with the worms on said sectional shaft, said last-mentioned shafts threaded into the first-mentioned bearings, and a band knife on said pulley and traveling in said temple means at right angles to the travel of fabric on said conveying means.

24. In a machine of the class described, the combination with a frame, of temple means on said frame, means for conveying double pile fabric to said temple means, a band knife and means for adjusting said band knife longitudinally with respect to said temple means, means on said frame for swinging said band knife, means on said frame for adjusting said band knife for tightening the same, and said band knife being adapted to pass through said temple means for cutting pile of a fabric fed to said temple means by said conveying means.

25. In a machine of the class described, the combination with a frame, of spaced pile bars extending across the frame, means for adjusting said pile bars with respect to each other, temple devices and means supporting said temple devices upon said frame, said temple devices having portions extending between said spaced pile bars, and cutting means normally positioned with one portion within said temple devices and also between said spaced pile bars.

26. In a machine of the class described, the combination with a frame, of pile bars mounted upon said frame, means for setting said pile bars for handling various thicknesses of fabric, cutting means having a portion positioned between said pile bars, and means located partly between said pile bars at the point of cutting the fabric, whereby said fabric is kept taut across its width during the cutting action.

27. In a machine of the class described, the combination with a frame, of spaced pile bars on said frame, means on said frame for adjustably mounting said pile bars whereby the space therebetween can be controlled, guides on said frame registering with the space between said pile bars, temple means partly in the space between said pile bars and positioned contiguous to said guides, and a traveling knife means having a portion working in said temple means at a point between said spaced pile bars and also having a portion traveling between said guides.

28. In a machine of the class described, the combination with a frame, of spaced pile bars and registering spaced guides positioned close together upon said frame, temple means partly interposed between said pile bars and registering with the space between said guides, and a band knife traveling between parts of said guides and between said spaced pile bars and within portions of said temple means.

WOODRUFF T. SULLIVAN.

REFERENCES CITED

The following references are of record in the file of this patent:

UNITED STATES PATENTS

| Number | Name | Date |
| --- | --- | --- |
| 294,970 | Coupland | Mar. 11, 1884 |
| 358,014 | Campbell | Feb. 22, 1887 |
| 514,433 | Ashworth et al. | Feb. 13, 1894 |
| 768,348 | Smith | Aug. 23, 1904 |
| 1,769,935 | Ballard | July 8, 1930 |
| 1,972,209 | Turner | Sept. 4, 1934 |